United States Patent [19]
Talcott

[11] Patent Number: 5,875,325
[45] Date of Patent: Feb. 23, 1999

[54] PROCESSOR HAVING REDUCED BRANCH HISTORY TABLE SIZE THROUGH GLOBAL BRANCH HISTORY COMPRESSION AND METHOD OF BRANCH PREDICTION UTILIZING COMPRESSED GLOBAL BRANCH HISTORY

[75] Inventor: Adam R. Talcott, Santa Clara, Calif.

[73] Assignee: International Business Machines Corporation, Armonk, N.Y.

[21] Appl. No.: 716,004

[22] Filed: Sep. 19, 1996

[51] Int. Cl.⁶ ...................................................... G06F 9/40
[52] U.S. Cl. ............................................ 395/587; 395/888
[58] Field of Search .................................... 395/585, 587, 395/888, 200.77

[56] References Cited

U.S. PATENT DOCUMENTS

| | | | |
|---|---|---|---|
| 4,370,711 | 1/1983 | Smith | 395/587 |
| 4,477,872 | 10/1984 | Losq | 395/5 |
| 4,679,141 | 7/1987 | Pomerene et al. | 395/587 |
| 5,463,746 | 10/1995 | Brodnax et al. | 395/375 |
| 5,564,118 | 10/1996 | Steely | 395/375 |
| 5,574,871 | 11/1996 | Hoyt | 395/376 |

OTHER PUBLICATIONS

Talcott, Adam R., "Improving the Efficiency of Branch History–based Branch Prediction Schemes through Dynamic Branch History Compression" Chapter 7, Doctoral—Dissertation available at http://meera.ece.ucsb.edu/part/talcott/html_dissertation/chapter07.html.

Primary Examiner—Eric Coleman
Attorney, Agent, or Firm—Anthony V. S. England; Brian F. Russell; Andrew J. Dillon

[57] ABSTRACT

A processor and method of predicting a resolution of a speculative branch instruction are described. According to the present invention, a plurality of predicted resolutions of speculative branch instructions and at least one group of bits that indicates a plurality of previous resolutions of branch instructions are stored. A compressed branch history is generated that indicates a number of like previous resolutions within each group of bits. In response to a detection of a speculative branch instruction, a particular predicted resolution among the plurality of predicted resolutions is accessed utilizing the compressed branch history, such that the size of the storage utilized to store the predicted resolutions is reduced as compared to prior art systems.

16 Claims, 3 Drawing Sheets

PROCESSOR HAVING REDUCED BRANCH HISTORY TABLE SIZE THROUGH GLOBAL BRANCH HISTORY COMPRESSION AND METHOD OF BRANCH PREDICTION UTILIZING COMPRESSED GLOBAL BRANCH HISTORY

BACKGROUND

1. Technical Field

The present specification relates in general to a method and system for data processing and in particular to a processor and method for speculatively executing a branch instruction. Still more particularly, the present specification relates to a processor having a reduced branch prediction storage size and a method of branch prediction utilizing a compressed branch history.

2. Description of the Related Art

A state-of-the-art superscalar processor can comprise, for example, an instruction cache for storing instructions, an instruction buffer for temporarily storing instructions fetched from the instruction cache for execution, one or more execution units for executing sequential instructions, a branch processing unit (BPU) for executing branch instructions, a dispatch unit for dispatching sequential instructions from the instruction buffer to particular execution units, and a completion buffer for temporarily storing sequential instructions that have finished execution, but have not completed.

Branch instructions executed by the branch processing unit (BPU) of the superscalar processor can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch in program flow specified by an unconditional branch instruction is always taken. In contrast, conditional branch instructions are branch instructions for which the indicated branch in program flow may be taken or not taken depending upon a condition within the processor, for example, the state of specified condition register bits or the value of a counter. Conditional branch instructions can be further classified as either resolved or unresolved, based upon whether or not the condition upon which the branch depends is available when the conditional branch instruction is evaluated by the branch processing unit (BPU). Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively execute unresolved branch instructions by predicting whether or not the indicated branch will be taken. Utilizing the result of the prediction, the fetcher is then able to speculatively fetch instructions within a target execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or dynamic branch prediction, which predicts resolutions of branch instructions by reference to branch history accumulated on a per-address basis within a branch history table. While conventional static and dynamic branch prediction methodologies have reasonable prediction accuracies for some performance benchmarks, the severity of the performance penalty incurred upon misprediction in state-of-the-art processors having deep pipelines and high dispatch rates necessitates increased prediction accuracy.

In response to the need for improved prediction accuracy, several two-level branch prediction methodologies have been proposed. For example, one two-level dynamic branch prediction scheme includes a first level of branch history that specifies the resolutions of the last K branch instructions and a second level of branch prediction storage that associates a resolution prediction with each (or selected ones) of the $2^K$ possible branch history patterns. Utilizing such two-level branch prediction schemes can result in high prediction accuracies (>95%) for selected performance benchmarks if the amount of branch history maintained at the first and second levels is large. However, the storage costs associated with such two-level branch prediction schemes, and in particular with the branch prediction storage, can be prohibitive.

Therefore, in order to achieve reasonably high branch prediction accuracy at a reasonable cost, a two-level branch prediction mechanism is needed that reduces the size of the branch prediction storage.

SUMMARY

It is therefore one object of the present disclosure to provide an improved method and system for data processing.

It is another object of the present disclosure to provide an improved processor and method for speculatively executing a branch instruction.

It is yet another object of the present disclosure to provide a processor having a reduced branch prediction storage size and a method of branch prediction utilizing a compressed branch history.

The foregoing objects are achieved as is now described. According to the present invention, a plurality of predicted resolutions of speculative branch instructions and at least one group of bits that indicates a plurality of previous resolutions of branch instructions are stored. A compressed branch history is generated that indicates a number of like previous resolutions within each group of bits. In response to a detection of a speculative branch instruction, a particular predicted resolution among the plurality of predicted resolutions is accessed utilizing the compressed branch history, such that the size of the storage utilized to store the predicted resolutions is reduced as compared to prior art systems.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
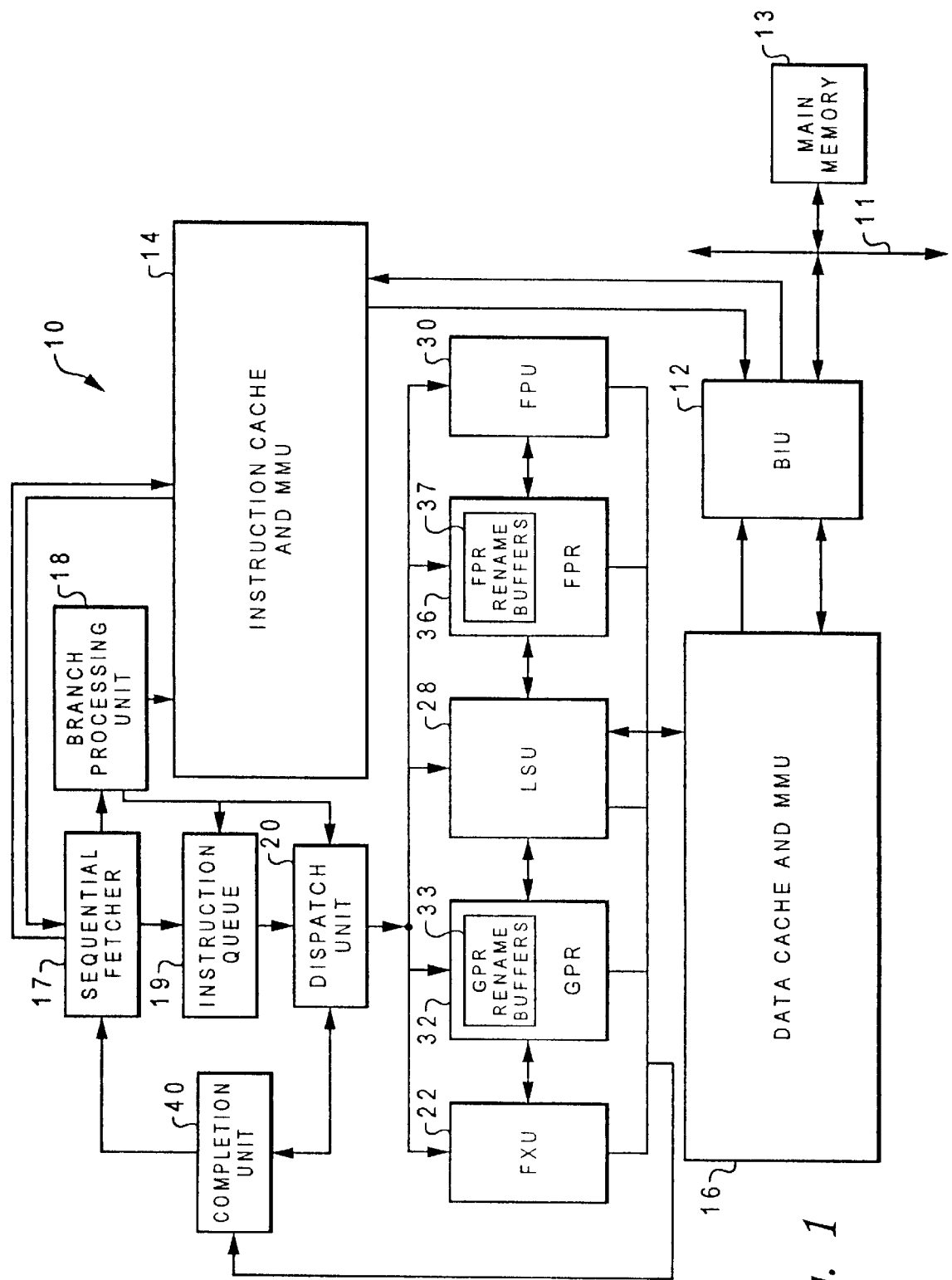
FIG. 1 depicts an illustrative embodiment of a processor having a two-level branch prediction mechanism in accordance with the present invention.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate that other suitable processors can be utilized. As illustrated in FIG. 1, processor 10 is coupled to system bus 11 via a bus interface unit (BIU) 12 within processor 10. BIU 12 controls the transfer of information between processor 10 and other devices coupled to system bus 11, such as main memory 13. Processor 10, system bus 11, and the other devices coupled to system bus 11 together form a data processing system.

BIU 12 is connected to instruction cache 14 and data cache 16 within processor 10. High-speed caches, such as instruction cache 14 and data cache 16, enable processor 10 to achieve relatively fast access times to a subset of data or instructions previously transferred from main memory to caches 14 and 16, thus improving the performance of the data processing system. Instruction cache 14 is further coupled to sequential fetcher 17, which fetches one or more instructions for execution from instruction cache 14 during each cycle. Sequential fetcher 17 transmits instructions fetched from instruction cache 14 to both branch processing unit (BPU) 18 and instruction queue 19, which decode the instructions to determine whether the instructions are branch or sequential instructions. Branch instructions are retained by BPU 18 for execution and cancelled from instruction queue 19; sequential instructions, on the other hand, are cancelled from BPU 18 and stored within instruction queue 19 for subsequent execution by other execution circuitry within processor 10. As noted above, branch instructions executed by BPU 18 can be categorized as either conditional or unconditional; conditional branch instructions can be further categorized as resolved or unresolved. Conditional branch instructions can depend upon the state of particular bits with a condition register (CR), which are set or cleared in response to various conditions within the data processing system, and/or upon the value stored within a count register (CTR).

In the depicted illustrative embodiment, in addition to BPU 18, the execution circuitry of processor 10 comprises multiple execution units for sequential instructions, including fixed-point unit (FXU) 22, load-store unit (LSU) 28, and floating-point unit (FPU) 30. As is well-known to those skilled in the computer arts, each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory 13) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, sequential instructions can be executed opportunistically by FXU 22, LSU 28, and FPU 30 in any order as long as data dependencies are observed. In addition, sequential instructions are processed by each of FXU 22, LSU 28, and FPU 30 at a sequence of pipeline stages. As is typical of many high-performance processors, each sequential instruction is processed at a number of distinct pipeline stages, namely, fetch, decode/dispatch, execute, finish, and completion.

During the fetch stage, sequential fetcher 17 retrieves one or more instructions associated with one or more memory addresses from instruction cache 14. As noted above, sequential instructions fetched from instruction cache 14 are stored by sequential fetcher 17 within instruction queue 19, while branch instructions are removed (folded out) from the sequential instruction stream. As described below, branch instructions are executed by BPU 18, which includes facilities that enable BPU 18 to speculatively execute unresolved conditional branch instructions with high prediction accuracy.

During the decode/dispatch stage, dispatch unit 20 decodes and dispatches one or more instructions from instruction queue 19 to execution units 22, 28, and 30. During the decode/dispatch stage, dispatch unit 20 also allocates a rename buffer within GPR rename buffers 33 or FPR rename buffers 37 for each dispatched instruction's result data. According to a the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers.

During the execute stage, execution units 22, 28, and 30 execute sequential instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. Then, execution units 22, 28, and 30 notify completion unit 40 which instructions stored within the completion buffer of completion unit 40 have finished execution. Finally, instructions are completed by completion unit 40 in program order by transferring data results of the instructions from GPR rename buffers 33 and FPR rename buffers 37 to GPRs 32 and FPRs 36, respectively.

Figure 2:
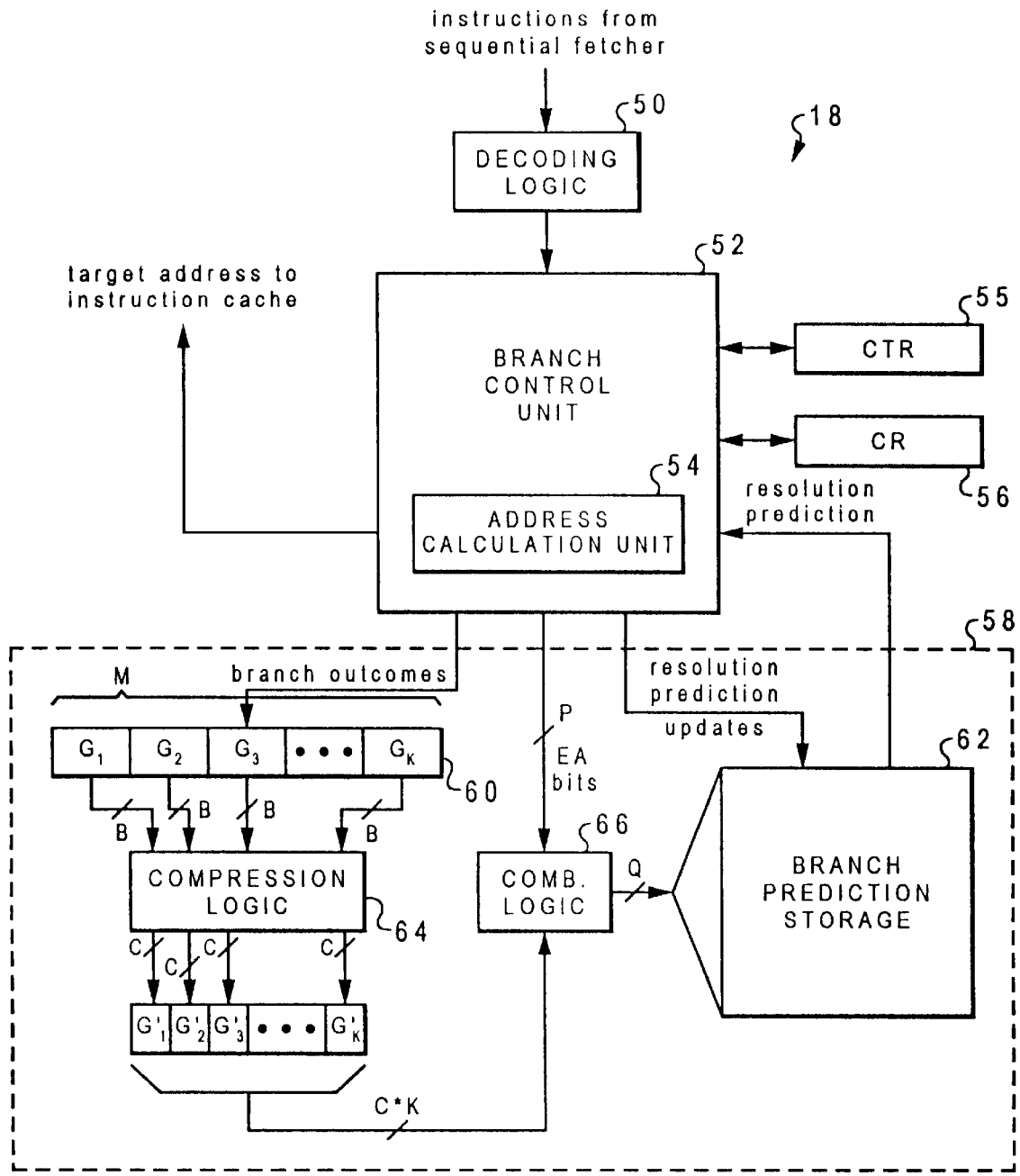
FIG. 2 illustrates a more detailed block diagram representation of the branch processing unit of the processor illustrated in FIG. 1.

Referring now to FIG. 2, there is depicted a more detailed block diagram representation of BPU 18 within processor 10. As illustrated, BPU 18 includes decoding logic 50, which decodes each instruction received by BPU 18 from sequential fetcher 17 to determine whether or not the instruction is a branch instruction, and if so, what type of branch instruction. In addition, BPU 18 includes branch control unit 52, which executes each branch instruction identified by decode logic 50 through calculating the effective address (EA) of a target execution path utilizing address calculation unit 54. As depicted, branch control unit 52 is coupled to condition register (CR) 56, which comprises a register including several bit fields that are set or cleared in response to various conditions within the data processing system. Branch control unit 52 references CR 56 to resolve each branch conditional instruction that depends upon the occurrence of an event that sets or clears a bit within CR 56. Branch control unit 52 is also coupled to count register (CTR) 55, which maintains a loop index that is referenced by branch control unit 52 to resolve branch conditional instructions that depend upon the loop index value.

Still referring to FIG. 2, BPU 18 further includes branch prediction unit 58, which is utilized by BPU 18 to predict resolutions of unresolved conditional branch instructions that depend upon either the value of CTR 55 or the state of a bit field within CR 56. As illustrated, branch prediction unit 58 comprises branch history register (BHR) 60, branch prediction storage (BPS) 62, compression logic 64, and combinational logic 66. In the depicted embodiment, BHR 60 comprises an M-bit shift register that stores the branch history of the last M conditional and unconditional branch instructions encountered in K groups of B bits. In response to receipt of an indication from branch control unit 52 that a branch was taken, BHR 60 records a "1"; if branch control unit 52 indicates that a branch was not taken, BHR 60 records a "0". Thus, BHR 60 stores a first level of branch history which is global, that is, shared by all branch instructions. In an alternative embodiment of the present invention, BHR 60 may be replaced by a branch history table (BHT) that stores branch history for each branch instruction address (a per-address BHT) or for each set of branch instruction addresses or opcodes (a per-set BHT).

BHR 60 is coupled to compression logic 64, which compresses the global branch history stored in BHR 60 into K groups of C bits, where C<B. According to the present invention, the compression of the global branch history is accomplished by computing the number of like branch outcomes (e.g., taken) within each of the K groups of bits within BHR 60 and concatenating the results to form a C*K-bit compressed global branch history, where C=$\log_2$ (B+1). In a preferred embodiment in which taken branches are represented by "1", compression logic 64 comprises K adders that each add together the B bits within a corresponding one of the K groups of bits within BHR 60. The C*K-bit compressed global branch history output by compression logic 64 is logically combined with P low-order bits of the effective address (EA) of an unresolved speculative branch instruction by combinational logic 66 to form a Q-bit index into BPS 62 (e.g., if the logical combination performed by combinational logic 66 is concatenation, P+C*K=Q). As will be described in detail below, compression of the global branch history permits a concomitant exponential reduction in the size of BPS 62.

BPS 62, which maintains the second of the two levels of branch history implemented by branch prediction unit 58, stores $2^Q$ branch predictions, which are each uniquely identified by an associated Q-bit index. Thus, in response to receipt of a Q-bit index from combinational logic 66, BPS 62 supplies the associated branch prediction to branch control unit 52. Branch control unit 52 updates the branch prediction associated with a particular Q-bit index following the resolution of the speculatively executed branch instruction as either taken or not taken. For example, in an implementation of BPS 62 in which a two-bit branch prediction is associated with each Q-bit index, the states "00" and "01" represent a prediction of not taken, and the remaining states "10" and "11" represent a prediction of taken. In response to resolution of a branch prediction as taken, branch control unit 52 increments the two-bit branch prediction value if the value is less than "11". Similarly, branch control unit 52 decrements a two-bit branch prediction value in response to a resolution of not taken if the prediction value is greater than "00".

As noted above, the size of BPS 62 is reduced in comparison to the size of branch prediction storage in prior art two-level branch prediction mechanisms due to the compression of the global branch history. Assuming the use of the same number of bits to represent predictions and the same number of low-order address bits utilized within the index, the present invention enables the size of BPS 62 to be reduced in comparison to that of prior art branch prediction storage by a factor of:

$$2^{(K*\log_2(\frac{M}{K}+1))-M}$$

For example, in a two-level branch prediction mechanism in which M=9 and K=3, the size of BPS 62 would be 12.5% of the size of a prior art branch prediction storage accessed utilizing all 9 global branch history bits.

Figure 3:
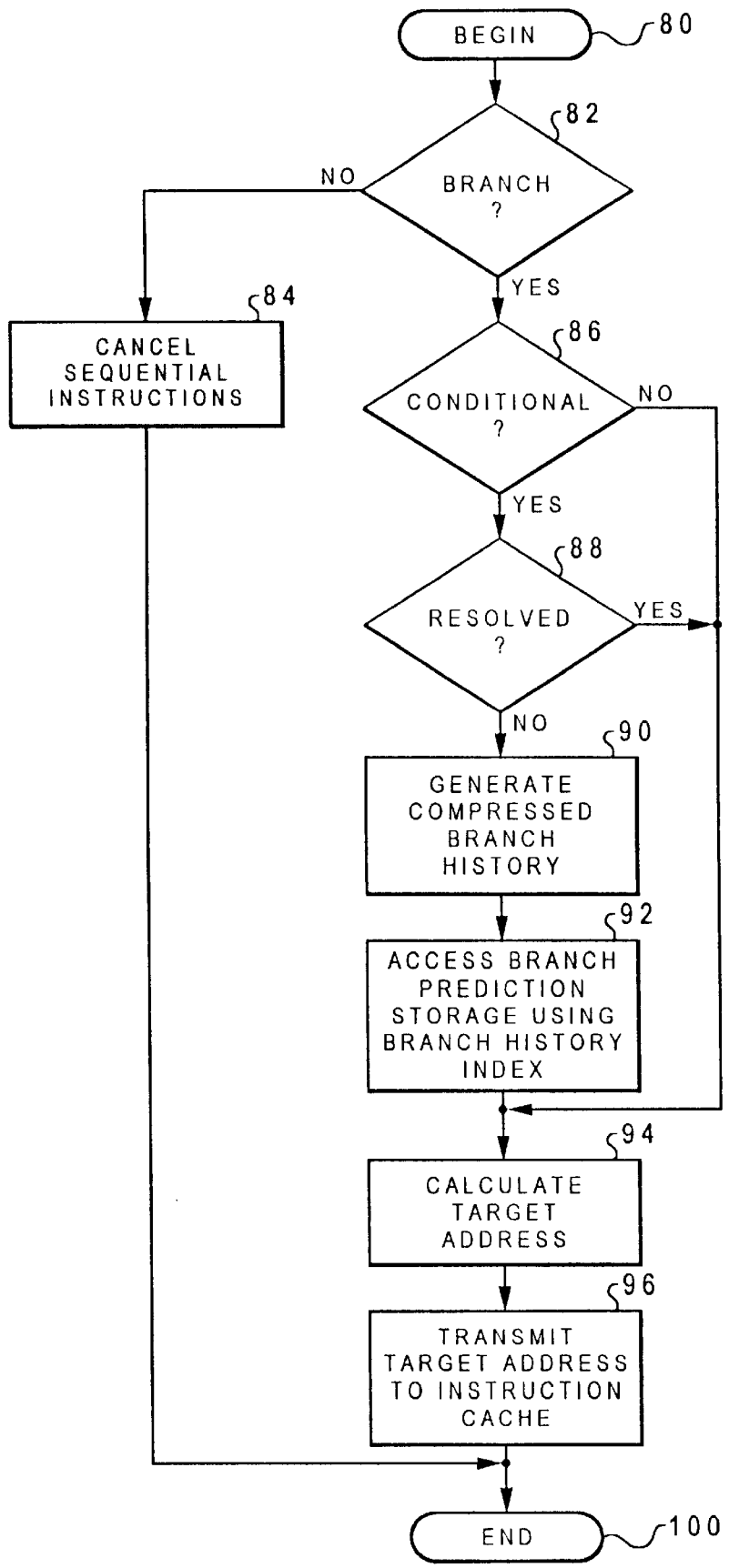
FIG. 3 depicts a high level logical flowchart of the method by which the branch processing unit illustrated in FIG. 2 processes instructions.

With reference now to FIG. 3, there is illustrated a high level logical flowchart of the method by which BPU 18 processes instructions. Those skilled in the art will appreciate from the following description that although the steps comprising the flowchart are illustrated in a sequential order, many of the steps illustrated in FIG. 3 can be performed concurrently or in an alternative order. As indicated, the process begins at block 80 in response to receipt by BPU 18 of one or more instructions from sequential fetcher 17. The process proceeds from block 80 to blocks 82–88, which depict decoding logic 50 making a determination of whether or not each instruction received from sequential fetcher 17 is a branch instruction, and if so, what type of branch instruction. In response to a determination at block 82 that an instruction is not a branch instruction, that is, that the instruction is a sequential instruction, the process then proceeds to block 84, which illustrates decoding logic 50 cancelling each sequential instruction from BPU 18. In the event a sequential instruction is cancelled from BPU 18, the sequential instruction is processed by sequential fetcher 17, dispatch unit 20, and execution units 22, 28, and 30 according to the method hereinbefore described with respect to FIG. 1.

Returning to block 82, in response to a determination that an instruction is a branch instruction, the process proceeds to block 86, which depicts decoding logic 50 determining whether or not the instruction is a conditional branch instruction. If not, the process proceeds to blocks 94 and 96, which illustrate address calculation unit 54 calculating a target address from information within the (absolute) branch instruction and transmitting the target address to instruction cache 14 in order to initiate fetching of instructions at the target address. The process then terminates at block 100. However, in response to a determination at block 86 that the branch instruction is a conditional branch instruction, the process passes to block 88, which depicts a further determination of whether or not the conditional branch instruction is a resolved conditional branch instruction. If so, the process proceeds from block 88 to block 94, which in the case of a resolved conditional branch instruction, illustrates the calculation of a target address by address calculation unit 54 based upon the value of CTR 55 or a bit state within CR 56. Next, the process proceeds to block 96, which depicts address calculation unit 54 transmitting the target address to instruction cache 14 in the manner which has been described. Thereafter, the process terminates at block 100.

Returning to block 88, in response to a determination that an instruction is an unresolved conditional branch instruction, the process proceeds from block 88 to block 90, which illustrates compression logic 64 generating a C*K-bit compressed global branch history from the M-bit global branch history stored within BHR 60. The process then proceeds to block 92, which depicts accessing a resolution prediction stored within BPS 62 utilizing a Q-bit index composed of the C*K-bit compressed global branch history and the P low-order bits of the EA of the speculative branch instruction. The process proceeds from block 92 to block 94, which illustrates address calculation unit 54 calculating a target address in response to the resolution prediction provided by BPS 62. For example, in response to a resolution prediction of "00" or "01", indicating a resolution prediction of "not taken," the target address generated by address calculation unit 54 is the next sequential instruction (i.e., "fall through") address. Alternatively, in response to a resolution prediction of "10" or "11", indicating a resolution prediction of "taken," address calculation unit 54 generates a target address representing a branch in program flow. The process proceeds from block 94 to block 96, which depicts address calculation unit 54 transmitting the target address to instruction cache 14, and thereafter terminates at block 100.

As has been described, the present invention provides an improved processor having a reduced-size branch history storage and an improved method of predicting a resolution of a speculatively executed unresolved branch instruction utilizing a compressed branch history. In addition to enabling the use of a smaller branch prediction storage, the present invention provides, for selected benchmarks, a higher prediction accuracy than prior art two-level branch prediction mechanisms having the same size of index due to the additional branch history incorporated with the compressed branch history.

While an illustrative embodiment has been particularly shown and described, it will be understood by those skilled in the art that various changes in form and detail may be made therein without departing from the spirit and scope of the illustrative embodiment.

What is claimed is:

1. A processor, comprising:

branch history storage including at least one group of bits, wherein said at least one group of bits indicates a plurality of previous resolutions of branch instructions;

compression logic that generates a compressed branch history, wherein said compressed branch history indicates a number of like previous resolutions within each of said at least one group of bits; and branch prediction storage that stores a plurality of predicted resolutions of speculative branch instructions, wherein a particular predicted resolution among said plurality of predicted resolutions is accessed utilizing said compressed branch history such that a size of said branch prediction storage is reduced.

2. The processor of claim 1, wherein each bit within said at least one group of bits in said branch history storage indicates a previous resolution of a single branch instruction.

3. The processor of claim 1, wherein said compressed branch history comprises at least one group of bits, each of said at least one group of bits in said compressed branch history corresponding to one of said at least one group of bits in said branch history storage, wherein each of said at least one group of bits comprising said compressed branch history includes fewer bits than a corresponding group of bits in said branch history storage.

4. The processor of claim 1, wherein each speculative branch instruction has an associated address, and wherein said particular predicted resolution is accessed utilizing both said compressed branch history and at least a portion of an address associated with a speculative branch instruction for which a resolution is to be predicted.

5. The processor of claim 1, said processor further comprising:

an address calculation unit that determines a target address of a speculative branch instruction in response to a predicted resolution of said speculative branch instruction.

6. A method of predicting a resolution of a speculative branch instruction within a processor, said method comprising:

storing a plurality of predicted resolutions of speculative branch instructions;

storing at least one group of bits that indicates a plurality of previous resolutions of branch instructions;

generating a compressed branch history that indicates a number of like previous resolutions within each of said at least one group of bits; and in response to a detection of a speculative branch instruction, accessing a particular predicted resolution among said plurality of predicted resolutions using said compressed branch history.

7. The method of claim 6, wherein each bit within said at least one group of bits indicates a previous resolution of a single branch instruction.

8. The method of claim 6, wherein said at least one group of bits is stored within branch history storage and wherein said step of generating a compressed branch history comprises:

generating a compressed branch history comprising at least one group of bits, each of said at least one group of bits in said compressed branch history corresponding to one of said at least one group of bits in said branch history storage, wherein each of said at least one group of bits comprising said compressed branch history includes fewer bits than a corresponding group of bits in said branch history storage.

9. The method of claim 6, wherein said speculative branch instruction has an associated address, and wherein said step of accessing a particular predicted resolution among said plurality of predicted resolutions comprises:

accessing a particular predicted resolution among said plurality of predicted resolutions utilizing both said compressed branch history and at least a portion of said associated address.

10. The method of claim 6, said processor further comprising:

determining a target address of said speculative branch instruction in response to said particular predicted resolution.

11. The method of claim 6, wherein said steps of generating and accessing are performed in a single processor cycle.

12. A data processing system, comprising:

a memory that stores instructions to be executed;

a processor coupled to said memory, said processor including:

branch history storage including at least one group of bits, wherein said at least one group of bits indicates a plurality of previous resolutions of branch instructions;

compression logic that generates a compressed branch history, wherein said compressed branch history indicates a number of like previous resolutions within each of said at least one group of bits; and branch prediction storage that stores a plurality of predicted resolutions of speculative branch instructions, wherein a particular predicted resolution among said plurality of predicted resolutions is accessed utilizing said compressed branch history such that a size of said branch prediction storage is reduced.

13. The data processing system of claim 12, wherein each bit within said at least one group of bits in said branch history storage indicates a previous resolution of a single branch instruction.

14. The data processing of claim 12, wherein said compressed branch history comprises at least one group of bits, each of said at least one group of bits in said compressed-branch history corresponding to one of said at least one group of bits in said branch history storage, wherein each of said at least one group of bits comprising said compressed branch history includes fewer bits than a corresponding group of bits in said branch history storage.

15. The data processing system of claim 12, wherein each speculative branch instruction has an associated address, and wherein said particular predicted resolution is accessed utilizing both said compressed branch history and at least a portion of an address associated with a speculative branch instruction for which a resolution is to be predicted.

16. The data processing system of claim 12, said processor further comprising:

an address calculation unit that determines a target address of a speculative branch instruction in response to a predicted resolution of said speculative branch instruction.

* * * * *